UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

MANUFACTURE OF REFRACTORY FURNACE-LININGS.

SPECIFICATION forming part of Letters Patent No. 265,066, dated September 26, 1882.

Application filed July 31, 1882. (No specimens.)

*To all whom it may concern:*

Be it known that I, JAMES HENDERSON, of Bellefonte, county of Centre, and State of Pennsylvania, (formerly of New York city,) have invented a new and useful Improvement in Compounds for Furnace-Linings and Fire-Brick, of which the following is such a specification as will enable those skilled in the art to understand and make the same.

This invention relates to the formation of a compound for furnace-linings and fire-brick, consisting of silica in a finely-divided state and a small proportion of mineral substances, which, with water, form a binding agent.

Before this my invention brick have been made of fire-clay containing one-third part of alumina and two-thirds parts silica, with small portions of other materials. These brick are contracted at the temperature of steel-melting furnaces, and are not capable of resisting the temperature used in steel-melting furnaces for so long a time as those which are the subject of this invention. Brick have heretofore also been made of silica and a very small portion of alumina, ranging from 0.75 to 2.50 per cent. Such bricks resist the highest temperatures; but they expand considerably at the temperatures of steel-melting furnaces and contract considerably in cooling, which is objectionable.

The object of this invention is to combine such proportions of silica and a binding material as will neither contract nor expand, and at the same time will be refractory and hard and firm in its composition.

In carrying out this my invention I use washed river-sand, such as is used for covering the hearths of iron-heating furnaces, which is free from oxide of iron, or pulverized sand-stone, such as is used in the manufacture of glass. The sand may be used as found; but I prefer to grind it to the fineness of flour. To the silica I add alumina, preferably in the form of fire-clay, which should be as free as possible from other substances, and should be dried and reduced to a fine flour. This is added to the silica in such proportion as to make about five per cent. of alumina, by weight, to the mixture of sand and fire-clay. These are preferably mixed in the dry state, and sufficient water added to make the mass cohere. In this condition it may be added wet to the furnace-hearth or other metallurgic vessel, and becomes solid and hardened when dried at the ordinary temperature, or when exposed to high temperatures, and can be advantageously applied as a lining for vertical walls or to form them of it entire. It is an economical substitute for fire-brick, and does not, by reason of the proportions, either expand or contract when exposed to the heat of a steel-melting furnace.

The above-described compound may be molded into brick and dried at the ordinary temperature, and be ready for use or burned in kilns and used as linings in the form of brick.

The alumina of the fire-clay makes a binding agent with the water to hold the silica together, and being used in the proportions given the compound does not either expand or contract under the heat of a steel-melting furnace.

I do not claim herein the compound of silica, magnesian lime, and water, as that forms the subject-matter of another application.

The fire-clay employed in the foregoing invention should be as free as possible from other substances that will form fusible compounds with the silica and fire-clay.

I am aware that silica and lime in the proportion of about ninety-five parts silica and five parts lime and water have been heretofore used to form fire-brick of; but

What I claim, and desire to secure by Letters Patent, is—

The compound for furnace-linings or fire-brick, consisting of silica and alumina and water in the proportions specified and set forth.

In witness whereof I have hereto set my hand this 25th day of July, 1882.

JAMES HENDERSON.

Witnesses:
ADAM WEIGHT,
JOHN C. SAYLOR.